(12) United States Patent
Prentice (10) Patent No.: US 10,047,427 B2
(45) Date of Patent: Aug. 14, 2018

(54) ARTICLE, AN INTERMEDIATE PRODUCT, AND A METHOD OF MAKING AN ARTICLE

(75) Inventor: Thomas Campbell Prentice, Abingdon (GB)

(73) Assignee: Zircotec Limited, Abingdon (GB)

( * ) Notice: Subject to any disclaimer, the term of this patent is extended or adjusted under 35 U.S.C. 154(b) by 1857 days.

(21) Appl. No.: 13/138,844

(22) PCT Filed: Apr. 9, 2010

(86) PCT No.: PCT/GB2010/000744
§ 371 (c)(1),
(2), (4) Date: Jan. 17, 2012

(87) PCT Pub. No.: WO2010/116159
PCT Pub. Date: Oct. 14, 2010

(65) Prior Publication Data
US 2012/0114915 A1    May 10, 2012

(30) Foreign Application Priority Data

Apr. 9, 2009   (GB) .................................. 0906312.4

(51) Int. Cl.
| B32B 3/10 | (2006.01) |
| C23C 4/02 | (2006.01) |
| C23C 4/18 | (2006.01) |
| F16L 59/02 | (2006.01) |
| F16L 59/07 | (2006.01) |
| F16L 59/08 | (2006.01) |
| C23C 4/11 | (2016.01) |

(52) U.S. Cl.
CPC .................. *C23C 4/02* (2013.01); *C23C 4/11* (2016.01); *C23C 4/18* (2013.01); *F16L 59/026* (2013.01); *F16L 59/027* (2013.01); *F16L 59/028* (2013.01); *F16L 59/029* (2013.01); *F16L 59/07* (2013.01); *F16L 59/08* (2013.01); *Y10T 428/24802* (2015.01); *Y10T 428/24851* (2015.01); *Y10T 428/24917* (2015.01)

(58) Field of Classification Search
CPC ....................... F16L 59/027; Y10T 428/24802
See application file for complete search history.

(56) References Cited

U.S. PATENT DOCUMENTS

| 4,136,222 A * | 1/1979 | Jonnes ......................... 428/116 |
| 2006/0216547 A1* | 9/2006 | Vance .......................... 428/697 |

OTHER PUBLICATIONS

A flexible turbine blade for passive blade pitch control in wind turbines by David MacPhee and Asfaw Beyene Jan. 19, 2012 http://ieeexplore.ieee.org/document/6134834/?reload=true&arnumber=6134834.*
Lawrence Butcher, "Zircotec ZircoFlex" (Aug. 1, 2009) (from http://www.racecar-engineering.com/news/products/384667/zircotex . . . ).
Darren Quick, "First-ever flexible ceramic heat shield material" ( Jul. 16, 2009) (from http: www.gizmag.com/zircoflex-flexible-heat-shield/12249/ . . . ).
"Press Release: new flexible ceramic material delivers lightweight heat protection for race cars" (Jul. 15, 2009).

* cited by examiner

*Primary Examiner* — Christopher M Polley
(74) *Attorney, Agent, or Firm* — Hahn Loeser & Parks, LLP (57) ABSTRACT

An article for insulation comprises a flexible substrate (200) and a thermal sprayed working layer (206) on the flexible substrate (200). The working layer (206) comprises an array of insulating elements. The insulating elements are separated by gaps so that the article is flexible.

16 Claims, 7 Drawing Sheets

ARTICLE, AN INTERMEDIATE PRODUCT, AND A METHOD OF MAKING AN ARTICLE

The present application is a 371 submission of PCT/GB2010/000744, filed 9 Apr. 2010, and published in the English language on 14 Oct. 2010 with publication number WO 2010/116159 A1, which claims the benefit of the filing date of GB 0906312.4, filed 9 Apr. 2009.

The invention relates to an article, an intermediate product, and a method of making an article.

It is known to coat metal parts, for example engine parts, by plasma spraying with a layer of ceramic or metal material.

According to one aspect of the present invention, there is provided an article for insulation, the article comprising a flexible substrate and a working layer thereon, the working layer comprising an array of insulating elements, the insulating elements being separated by gaps so that the article is flexible.

As the substrate is flexible, the article can be wrapped around or moulded onto components or surfaces.

The flexible substrate is preferably a metal foil, most preferably aluminium foil. A plurality of the gaps are preferably aligned to form straight, open grooves. This enables the article to be folded at the grooves. The elements may be rectangular and may be square. This allows the article to be more flexible in particular directions, for example, for rolling up. The article may comprise at least one further flexible substrate over the layer. Preferably the article includes a further layer on the further flexible substrate, the layer comprising an array of insulating elements, the insulating elements being separated by gaps.

Preferably the or each layer is a thermally sprayed layer.

According to another aspect of the present invention, there is provided an article comprising a substrate and a thermally sprayed working layer thereon, the working layer including pockets or gaps in which air can collect.

The thermally sprayed working layer in the article or final product can have increased thermal barrier properties compared to standard thermally sprayed layers as the air pockets or gaps in the layer increase the thermal insulation effect of the layer. Furthermore, as the thermal barrier effect of the layer is increased, a thinner layer is needed to achieve the same thermal barrier effect, and so weight savings can also be realised.

According to a further aspect of the present invention, there is provided an article in the form of an intermediate product comprising a substrate with a thermally sprayed working layer thereon, the layer including pockets of a sacrificial material to be removed to form the final product.

The pockets or gaps may be at least 0.1 mm in diameter, preferably more than 0.5 mm in diameter. The pockets or gaps are preferably no more than 5 mm in diameter.

The pockets or gaps may be at the boundary with the substrate, or may be at the surface of the working layer and open to atmosphere, or may be within the body of the working layer.

Where the working layer includes pockets or gaps which are open to the substrate, the article preferably has a proportion of the surface which does not have the thermally sprayed layer directly bonded to it being between 10% and 80%, more preferably between 20% and 40%, and most preferably between 25% and 35%.

The thermal barrier properties increase with increasing area of debond, although not in direct proportion. In addition, in articles with a higher debond proportion, the layer is more weakly adhered to the substrate, and so an intermediate level of debond may be preferred.

Preferably the percentage by volume of pockets or gaps in the layer is between 15% and 45%, more preferably between 20% and 40%, and most preferably between 25% and 35%.

The substrate of the article may be made of or contain an organic material. The organic material may be any suitable organic material and may be plastics material or a composite material including a matrix made of plastics material. The substrate may be made of glass reinforced plastic composite material or the like, and in a preferred embodiment the surface is made of carbon fibre composite material. Carbon fibre composite materials are popular in a range of industries primarily because of their high strength and low weight.

In preferred embodiments the working layer is made of ceramic or metal or ceramic and metal. Where the working layer is made of metal, the working layer may be designed to achieve desired electrical or electromagnetic properties. Where the working layer is made from ceramic, the thermally sprayed layer may be designed to achieve desired thermal barrier or mechanical damage resistance properties.

The article may include at least one additional layer on the thermally sprayed layer. The or each additional layer may also be a thermally sprayed layer or may be deposited in another suitable way such as by electroless deposition, physical vapour deposition (PVD), chemical vapour deposition (CVD) or as a paint or by printing or moulding thereon. The or each additional layer may be made of any suitable material and may be made of ceramic or metal or ceramic and metal.

The or each additional layer may be a thermally sprayed layer, the layer including pockets or gaps in which air can collect. Where the article is in the form of an intermediate product, the or each additional layer may be a thermally sprayed layer, the layer including pockets of a sacrificial material to be removed to form the final product.

The total thickness of the layers may be such as to provide increased local mechanical strength. The total thickness may be as high as several hundred micrometers.

The article may include a bonding layer underneath the thermally sprayed layer. The bonding layer may be of a material with a lower melting point than the material of the thermally sprayed layer. In this way, a high melting point material can be provided as a layer on a substrate of or containing an organic material in a manner which would not previously have been possible without deleterious melting or degassing or other heat damage to the organic material.

The layer of bonding material may be of higher melting point than the organic material. Preferably the bonding material has a melting temperature of no more than 1200° C., more preferably under 700° C. The layer of bonding material is preferably a metal material, but in another embodiment it may be a ceramic material such as a zirconate ceramic material. Where the bonding material is a metal material it may include one or more of tin, copper, aluminium, silver, gold, lead and zinc. In preferred embodiments the bonding material is copper or aluminium or a copper aluminium alloy.

The layer of bonding material may be of any desired thickness and may for example be from 2 to 500 micrometers in thickness.

The layer of bonding material may cover the whole of the said surface of the article or may cover only a selected part of the surface. This may be to achieve a particular technical result, such as electrical conductivity, electromagnetic shielding or electromagnetic transmission or heat resistance, for example, in selected areas or may alternatively or in addition be for decorative purposes.

The substrate may take any suitable form. The substrate may be rigid, but in one embodiment, the substrate is flexible, and may be made from a metal foil. This enables the flexible substrate to wrap around or be moulded onto components or surfaces.

Where the pockets or gaps are at the surface of the layer, the article may include a sheet over the layer in order to close the pockets or gaps, so that they are not open to atmosphere. The article may include a further layer thereon, the layer including pockets or gaps in which air can collect. The further layer may be a thermally sprayed layer. A further sheet may be provided thereon.

Where the pockets or gaps are within the body of the layer, the article may include a strengthening layer thereon. Particularly where the percentage by volume of pockets or gaps in the layer is high, this additional layer may be useful in providing extra strength. The strengthening layer may be a layer without pockets or gaps and may be a thermally sprayed layer. The article may include a further layer thereon, the layer including pockets or gaps in which air can collect. The further layer may be a thermally sprayed layer. A further strengthening layer may be provided thereon. This provides a suitable balance between thermal barrier properties and strength.

According to another aspect of the invention there is provided a method of making an article, the method comprising the steps of:

thermally spraying a substrate with a layer of material;
before, during, or after the step of thermally spraying, introducing pocket or gap creation means; and then
removing the pocket or gap creation means to achieve a layer with pockets or gaps.

The pocket or gap creation means may be removed in any suitable way. In one embodiment the pocket or gap creation means is soluble and is preferably removed by dissolving. Alternatively, the pocket or gap creation means may be suitable for removing by heating and preferably removed by heating. In such cases, the pocket or gap creation means is preferably introduced before or during the step of thermally spraying the surface.

The step of introducing the pocket or gap creation means may comprise applying a liquid, such as a solution or suspension, to part of the surface of the substrate and then allowing the solution or suspension to dry, creating areas of solid material on the surface. In the case of a solution, the solution may be a salt solution. Alternatively, the gap creation means may be a liquid such as a paint or adhesive or other hardenable liquid material applied to part of the surface of the substrate. The liquid may be applied through a mesh, or in any other suitable way to achieve an array of areas of debonding material on the substrate.

The pocket or gap creation means may be applied by thermal spraying, preferably during spraying of the thermally sprayed layer. The pocket or gap creation means may be a powder, the pocket or gap creation means powder being mixed with the powder for the thermally sprayed layer and thermally sprayed at the same time as the thermally sprayed layer, preferably by plasma spraying.

The pocket or gap creation means may be a mesh or other partial barrier, through which the coating is thermally sprayed.

The step of removing the pocket or gap creation means may be carried out in any suitable way and may comprise mechanically removing the pocket or gap creation means, or dissolving the pocket or gap creation means, or alternatively heating to burn out the pocket or gap creation means, or chemically reacting the pocket or gap creation means.

Any suitable thermal spraying technique may be used, such as wire spraying, and in a preferred embodiment, the step of thermally spraying the substrate with a layer of material comprises plasma spraying the layer onto the substrate. Any suitable gas may be used for the plasma spraying and in a preferred embodiment the gas is nitrogen.

In preferred embodiments the layer is made of ceramic or metal or ceramic and metal. Where the layer is made of metal, the layer may be designed to achieve desired electrical or electromagnetic properties. Where the layer is made from ceramic, the layer may be designed to achieve desired mechanical damage resistance properties.

The total thickness of the deposited layers may be such as to provide increased local mechanical strength. The total thickness may be as high as several hundred micrometers.

The method may include roughening the substrate surface prior to thermal spraying thereon. The roughening may be effected by mechanical abrasion, for example by grit blasting.

A bonding layer may be applied by thermal spraying before the step of applying the working layer. Where the substrate is made of or contains an organic material, the bonding layer may be of a higher melting point than the organic material. The bonding layer is preferably a metal material, but in another embodiment it may be a silicate material. Where the bonding layer material is a metal material it may include one or more of tin, copper, aluminium, silver, gold, lead and zinc. In preferred embodiments the bonding layer material is copper or aluminium or a copper aluminium alloy.

The bonding layer may be applied to any desired thickness and may for example be from 2 to 100 micrometers in thickness.

The bonding layer material may be any suitable material and may be made of a material with a lower melting point than the thermally sprayed layer material. In this way, a high melting point material can be provided as a layer on a surface made of or containing organic material in a manner which would not previously have been possible without deleterious melting or degassing of the organic material.

The method may include depositing at least one additional bonding layer. The or each additional bonding layer may also be deposited by thermal spraying such as plasma spraying or may be deposited in another suitable way such as by electroless deposition, physical vapour deposition (PVD), chemical vapour depostion (CVD) or as a paint or by printing or by moulding. The or each additional bonding layer may be made of any suitable material and may be made of ceramic or metal or ceramic and metal.

The method may include introducing pocket or gap creation means before or concurrently with the step of depositing the or each additional layer to the or each first layer.

Embodiments of this invention will now be descried by way of example and with reference to the accompanying drawings, in which:

FIG. 1 is cross sectional views of the first embodiment of the present invention a) before immersing in water to dissolve the salt; and b) after immersing in water so that the salt has dissolved.

FIG. 2 is cross sectional views of the second embodiment of the present invention a) before immersing in water to dissolve the salt; and b) after immersing in water so that the salt has dissolved.

FIG. 3 is cross sectional views of the third embodiment of the present invention a) before immersing in water to dissolve the salt; and b) after immersing in water so that the salt has dissolved.

FIG. 4 is cross sectional views of fourth embodiment of the present invention a) with tape on the steel plate; b) with a first bond layer applied; c) with the tape removed; d) with a salt layer applied; e) with the salt layer rubbed down; f) with a second bond layer applied; and g) with a ceramic layer applied.

FIG. 5 is cross sectional views of the fifth embodiment of the present invention a) before immersing in water to dissolve the salt, and with a first layer of ceramic; b) before immersing in water to dissolve the salt, and with a second layer of ceramic; and c) after immersing in water so that the salt has dissolved.

FIG. 6 a) is a cross sectional view of the sixth embodiment of the present invention, with a mesh on the foil; b) is a cross sectional view with a bond layer, with the mesh still present; c) is a cross sectional view with a bond layer and a ceramic layer, with the mesh still present; d) is a cross sectional view with a bond layer and a ceramic layer, with the mesh removed; e) is a plan view of the mesh on the substrate; f) is a plan view once the bond layer and ceramic layer have been sprayed, and the mesh has been removed; and g) is a cross section of several layers of foil with air gaps.

EMBODIMENT 1

Figure 1A:
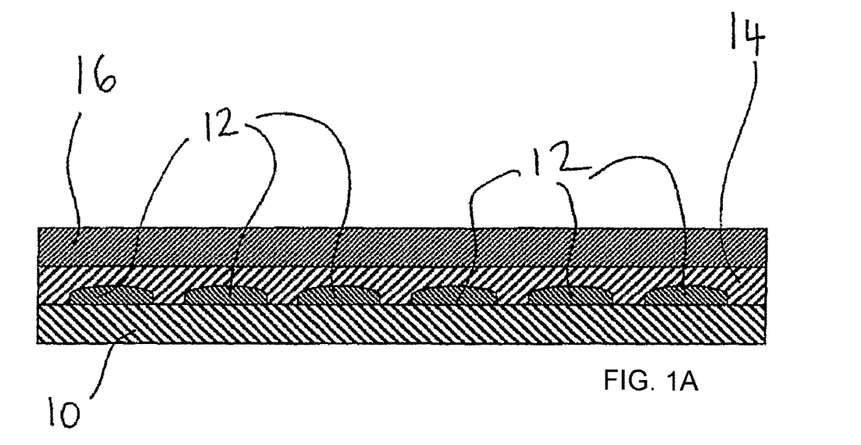

A mild steel plate 10 of dimensions 150 mm×150 mm by 1.5 mm thick was carefully cleaned, using acetone, then wiped with tissue to remove any liquid. The clean plate 10 was then grit blasted on one side using a siphon type grit blast system at 40 psi, with grit between 0.4 mm and 0.6 mm in size. The plate 10 was blown with dry air to remove any debris and wiped with an acetone damp tissue.

The plate 10 was then mounted onto a turntable in a plasma spray booth, containing a robot manipulation system. The plate 10 was heated up to 200° C. using a torch and a steel mesh with 32% open area was placed in front of the plate. A sacrificial, pocket creation material, in the form of a saturated sodium chloride solution, was sprayed through the mesh to provide an array of sodium chloride solution patches on the surface of the plate 10. The sodium chloride solution was allowed to dry, leaving an array of salt patches 12 on the plate 10.

The spray system was set to work in nitrogen and aluminium powder feed set to spray at 30 gm/min. Nitrogen flow was preset to 50 liters/min, and current to 300 A. The robot was programmed to operate a ladder type spray pattern, at a stand off distance of 100 mm from the plate 10, while the plate 10 was rotated. These parameters were used to apply two layers of aluminium to produce an aluminium bond coat of 50 µm thickness.

Using the same type of spray program at 75 mm spray distance, using standard nitrogen plasma parameters, magnesium zirconate was plasma sprayed onto the aluminium coating on the plate 10 at 40-50 gm/min. Four coats gave a layer 16 with a thickness of ~95-105 µm.

Figure 1B:
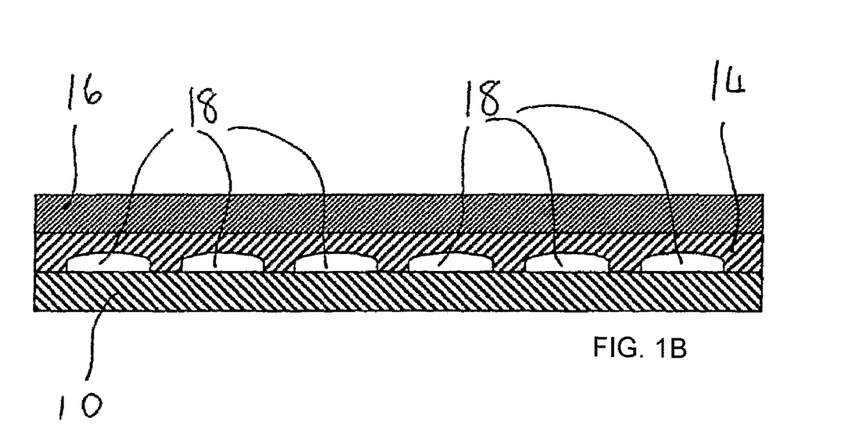

The plate was then immersed in water for a few minutes to dissolve the sodium chloride. The plate was then washed and immersed in dilute phosphoric acid to pacify the steel.

Ceramic layers provide good thermal resistance. Using the above method, the salt solution acts as a pocket creation means, and an article is formed which has air pockets 18 in the thermally sprayed aluminium bond coat 14 at the positions of the salt patches before the sample is immersed in water. Air is a very good thermal barrier and so the air pockets 18 in the aluminium bond coat 14 improve the thermal resistance of the layer 14,16 as a whole. The plate 10 had an increase in thermal barrier properties from both the front and the back, as measured by thermocouples, of approximately 30% compared to a plate with standard ceramic coating, so that the coating, although only 125 µm thick, outperformed an equivalent coating 300 µm thick formed without pockets.

Although in this example salt solution was used, any suitable material which can be applied and subsequently removed can be used, particularly, but not exclusively, those which can be applied by plasma spraying, for example, paint or water soluble tape. In addition, the pocket creation means may be removed by burning off.

EMBODIMENT 2

Figure 2A:
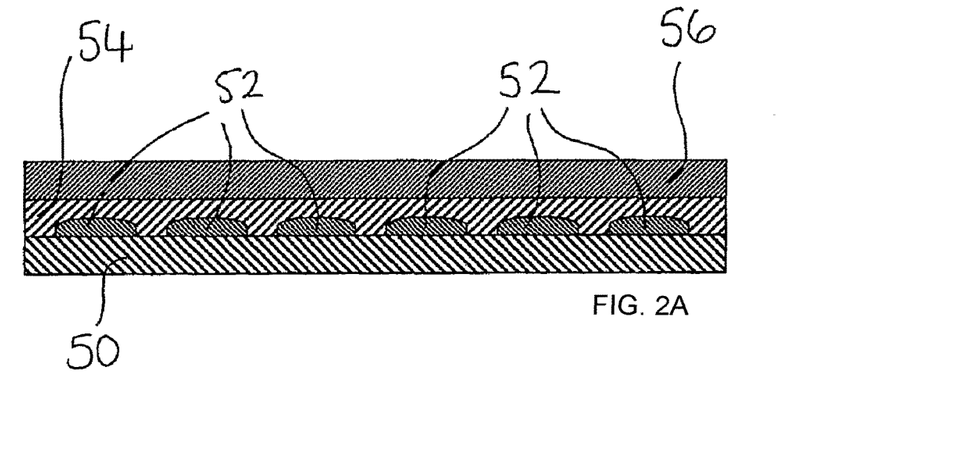

A coupon 50 of carbon fibre reinforced plastics material of dimensions 150 mm×150 mm by 2 mm thick was carefully cleaned, using acetone, then wiped with tissue to remove any liquid.

The clean coupon 50 was then grit blasted on one side using a siphon type grit blast system at 40 psi, with grit of between 0.4 and 0.6 mm size. The coupon 50 was blown with dry air to remove any debris and wiped with an acetone damp tissue.

The coupon 50 was then mounted onto a turntable in a plasma spray booth, containing a robot manipulation system. The spray system was set to work in nitrogen and the sodium chloride feed set to spray at 30 gm/min. The sodium chloride was sieved, in preparation for plasma spraying, to a particle size of below 120 µm diameter. Nitrogen flow was preset to 50 liters/min, hydrogen to 5 liters/min and current to 400 A. The robot was programmed to operate a ladder type spray pattern, at a stand off distance of 100 mm from the coupon, while the coupon 50 was rotated. A fine aluminium mesh, with 1.5 mm diameter holes and 22% open area, was clamped to the coupon 50. The sodium chloride was sprayed through the mesh, to create salt dots 52 on the surface of the coupon 50.

An aluminium bond coat was then thermally sprayed using the same parameters as above. The bond coat had a thickness of approximately 25 µm. A second coat was then applied in the same way to provide a layer 54 with a total coating thickness of 50 µm.

Using the same type of spray program at 75 mm spray distance, using standard nitrogen plasma parameters, magnesium zirconate was plasma sprayed onto the aluminium coating on the coupon 50 at 44 gm/min. Five coats gave a layer 56 with a thickness of 150 µm. This was rubbed down using fine emery paper to give a smooth, shiny surface.

Repeating the aluminium spray program, but only applying one coat on top of the magnesium zirconate coating, gave a thin 25 µm metal layer 16.

Figure 2B:
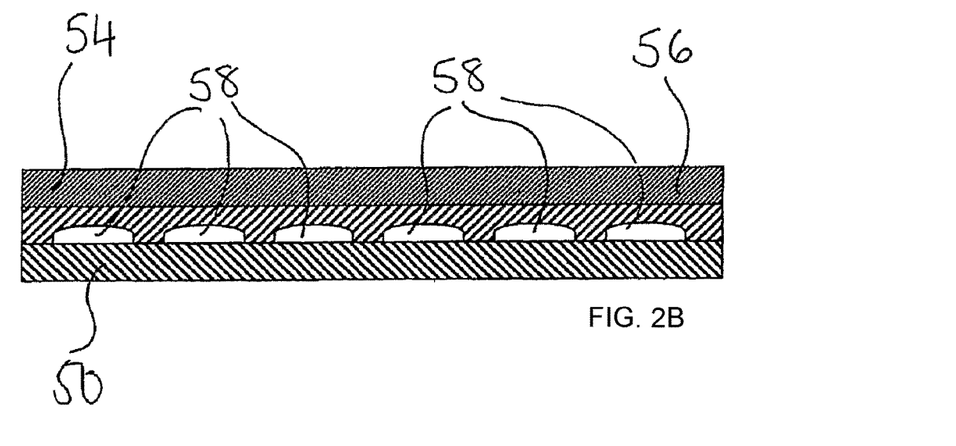

The coupon 50 was then immersed in water for about 15 mins to dissolve the salt pockets and dried. The resulting coating contained air pockets 58 where the salt had been. The surface of the coating had quite obvious raised dots, where the air pockets were located.

Carbon fibre reinforced plastics material is naturally relatively soft and susceptible to abrasion. The use of an aluminium bond layer 12 in this example allows a layer 14 of ceramic in the form of magnesium zirconate to be applied. Carbon fibre reinforced plastic is often used in applications where minimisation of weight is desirable, and especially in applications which need high strength but low weight. The ceramic coating produced has above has improved thermal barrier properties over a standard ceramic coating without air pockets. Therefore, for a desired level of thermal resistance, it is possible for the resulting article to be even lighter in relation to its strength, than articles with a standard coating.

EMBODIMENT 3

Figure 3A:
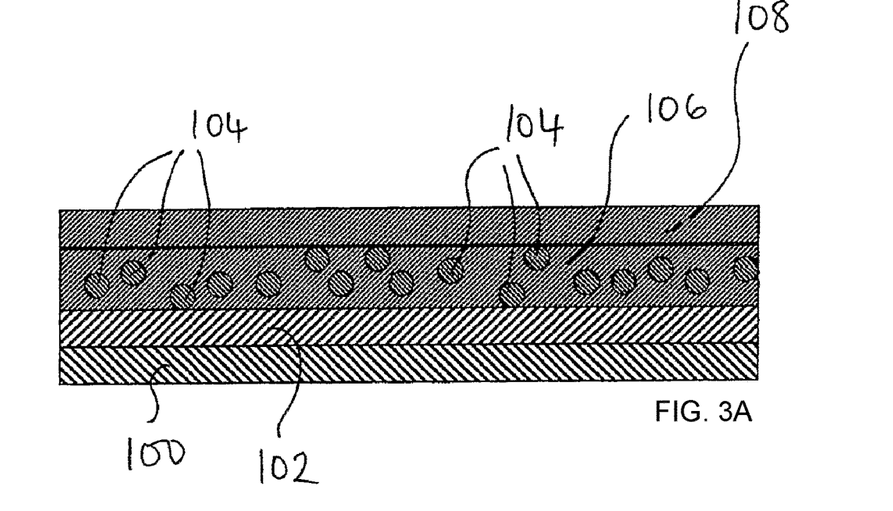

A coupon 100 of mild steel of dimensions 150 mm×150 mm by 1.5 mm thick was prepared as in embodiment 1 and then mounted onto a turntable in a plasma spray booth, containing a robot manipulation system. A Ni—Al bond coat 102 was plasma sprayed onto the coupon 100, using the same parameters as for the bond coat in embodiment 1.

Sodium chloride powder, sieved so that the maximum particle diameter was <120 μm was mixed with magnesium zirconate powder to a volume of 50%. This was sprayed using the same spray parameters as in embodiment 1 to produce a layer with salt 104 dispersed in thermal barrier material 106. A further ceramic coating 108, without salt, was then applied, in the same manner.

Figure 3B:
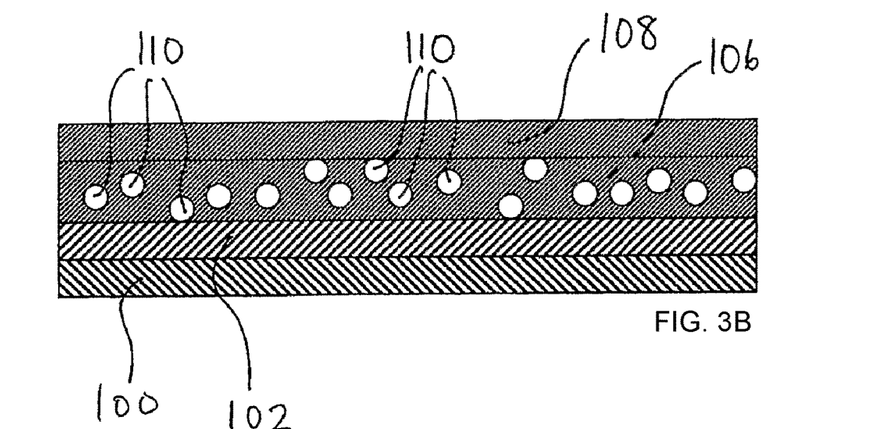

The coupon was then immersed in water for a few minutes to dissolve the sodium chloride, thus leaving air pockets 110 in the thermal barrier layer 106.

The first layer was 33% porous. This provides very good thermal barrier characteristics but relatively low strength. The addition of a conventionally thermal sprayed layer without a pocket creation material provides improved strength.

EMBODIMENT 4

Figures 4A, 4B, 4C, 4D, 4E:
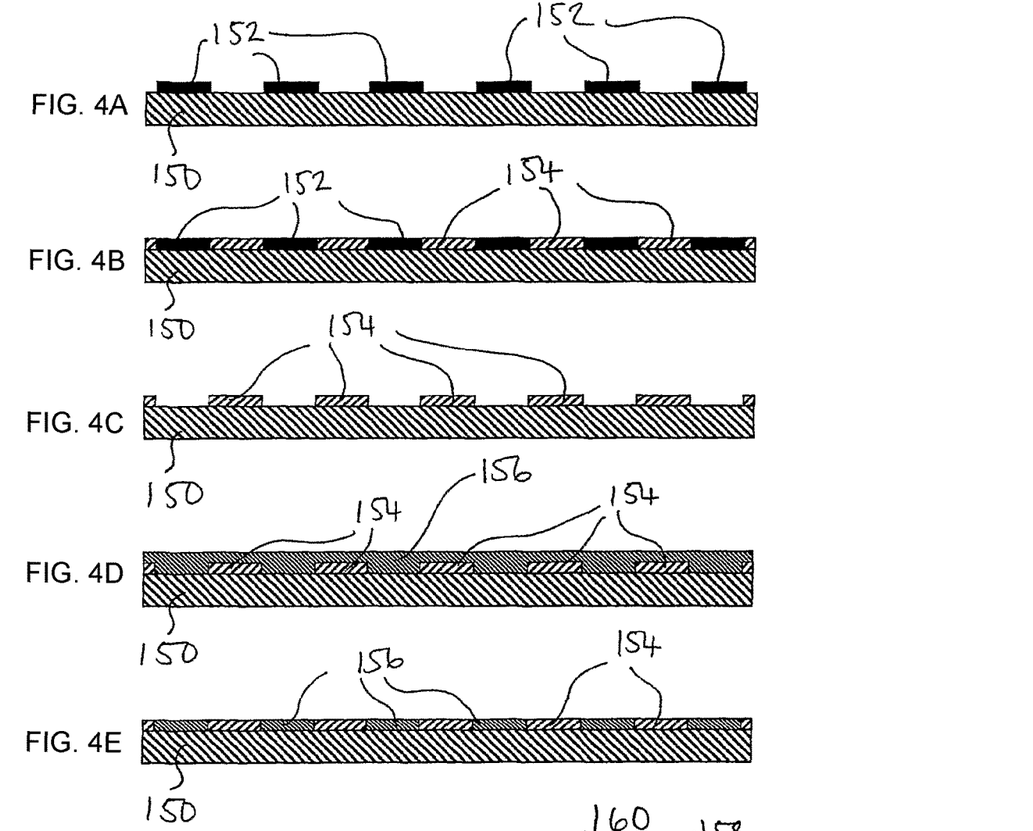

A steel plate 150 which had not been grit blasted was prepared by applying small dots of tape 152 of dimensions 6 mm×6 mm. to the surface of the plate 150, so that approximately 46% of the surface area of the plate 150 was covered. The plate 150 was then grit-blasted as in embodiment 1.

The plate 150 was then mounted onto a turntable in a plasma spray booth, containing a robot manipulation system. Two layers of aluminium, each 25 μm thick, were applied in the same manner as in embodiment 1 to create a bond coat 154.

The tape 152 was then removed by hand, and the whole surface of the plate 150 was sprayed with a sodium chloride solution, in the same manner as in embodiment 1 (although a mesh was not used). The surface was then rubbed down with a hard grinding block so that the sodium chloride was removed from the bond-coated areas but remained as pockets 156 in the wells where the tape previously was. Further bond coat 158 was then applied over the whole surface in the same manner as the previous layer 154. A layer of magnesium zirconate 160 was plasma sprayed onto the aluminium coating 158 on the plate 150, in the same manner as in embodiment 1.

Figures 4F, 4G:
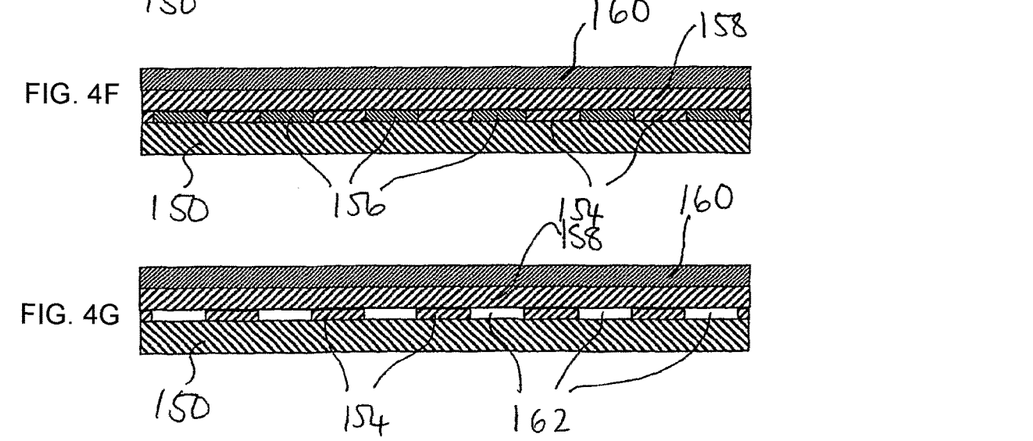

The plate was then immersed in water for a few minutes to dissolve the sodium chloride resulting in air pockets 162 in the layer 154. The plate was then washed and immersed in dilute phosphoric acid to pacify the steel.

Although the percentage of the surface area masked with tape, and subsequently covered with salt solution was 46% in this embodiment, and therefore the debonded area in the final article was 46%, any desired area could be masked so that it is debonded in the final article. In another embodiment 70% debonded area was achieved.

EMBODIMENT 5

Figure 5A:
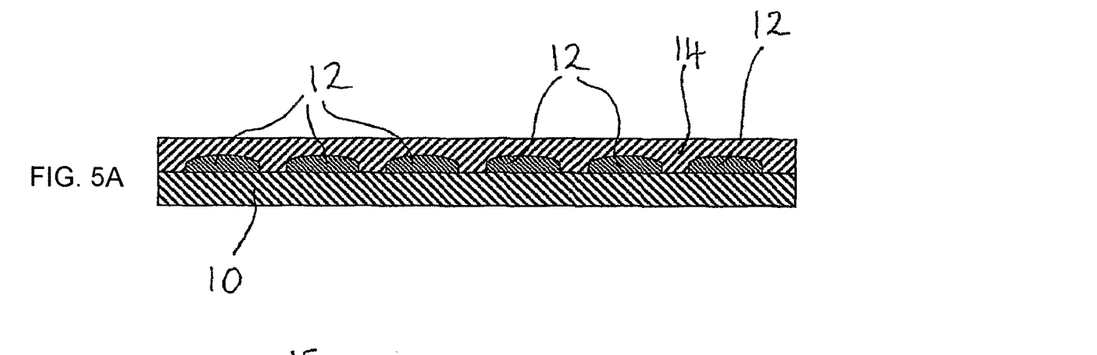
Figure 5B:
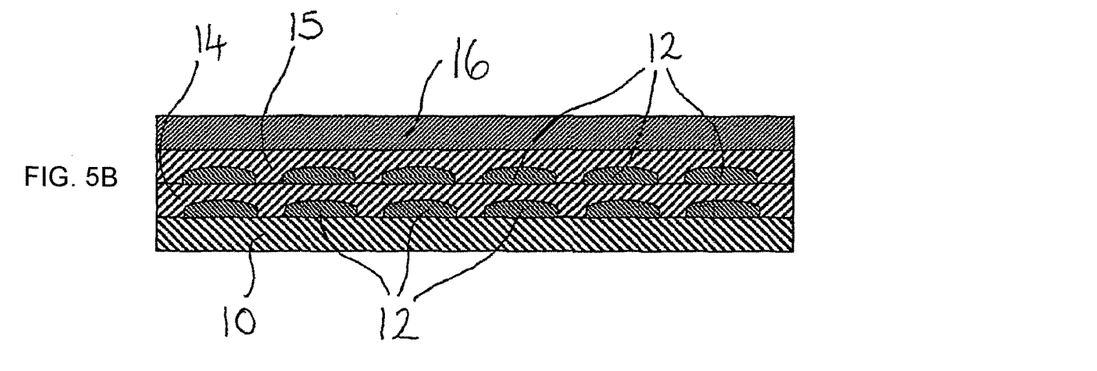
Figure 5C:
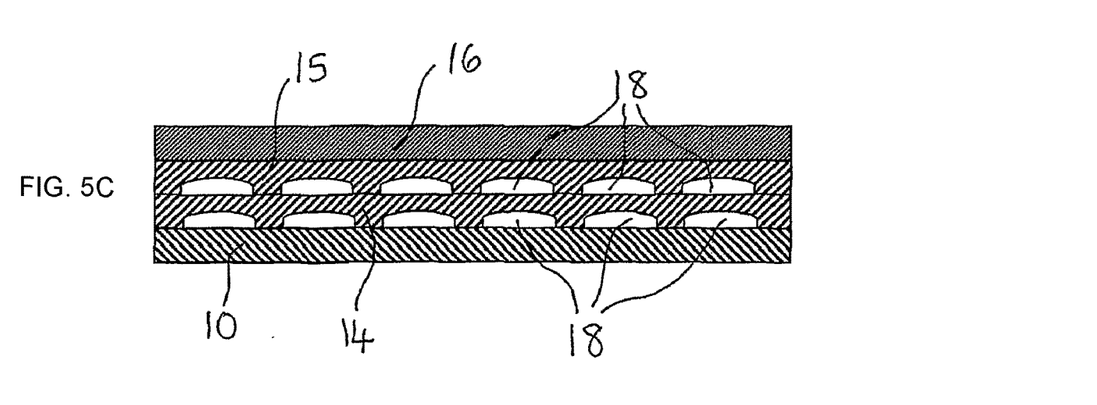

This embodiment is similar to the first embodiment and only the differences from that embodiment will be described. In this embodiment, after the aluminium layer 14 has been sprayed, the plate 10 is mounted onto the turntable in the plasma spray booth again, with the aluminium coated side facing the robot. The plate 10 is again heated up to 200° C. using a torch and a steel mesh with 32% open area is placed in front of the plate 10. Saturated sodium chloride solution, is sprayed through the mesh to provide an array of sodium chloride solution patches 12 on the surface of the aluminium layer 14 on the plate 10. The sodium chloride solution is allowed to dry, leaving an array of salt patches 12. A further aluminium layer 15 is then sprayed over the first aluminium layer 14. A magnesium zirconate layer 16 is then plasma sprayed onto the plate 10 as in the first embodiment. The plate 10 is then immersed in a bath through which unheated mains cold water flows for 15 minutes to dissolve and thereby remove the salt 12.

The resulting article has two layers of pockets 18. Thus more air is trapped than would be possible in a single layer structure without risk of the entire layer debonding. This technique therefore allows greater thermal insulation to be achieved using substantially the same manufacturing method.

An alternative would be to spray salt patches on the surface of the second aluminium layer 15, and then spray the magnesium zirconate layer 16, to create an arrangement in which the magnesium zirconate 16 layer also has air pockets 18.

Although a substrate in the form of a flat plate has been described, substrates in other shapes could be used, and in that case, the mesh need not be flat but might be shaped to follow the contour of the substrate.

EMBODIMENT 6

Figure 6A:
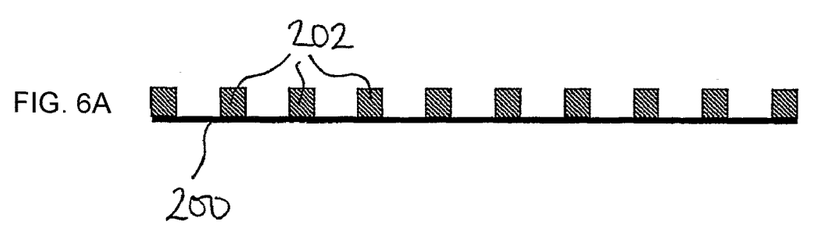
Figure 6B:
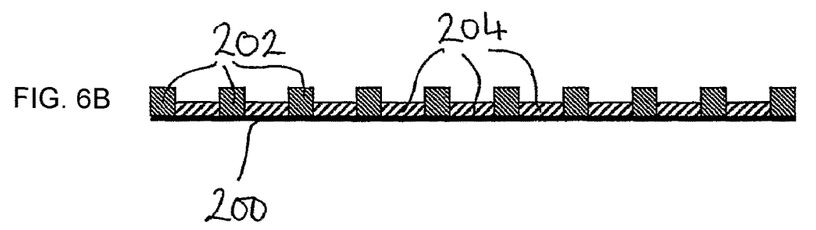
Figure 6C:
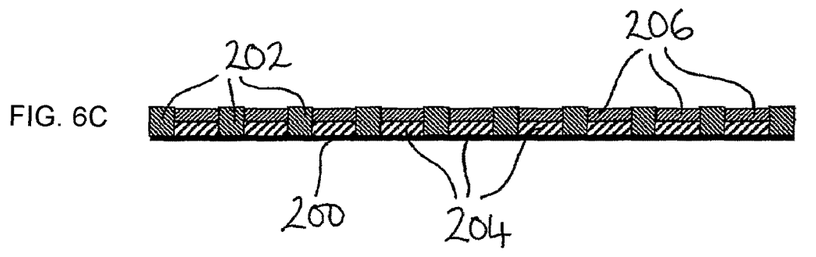
Figure 6D:
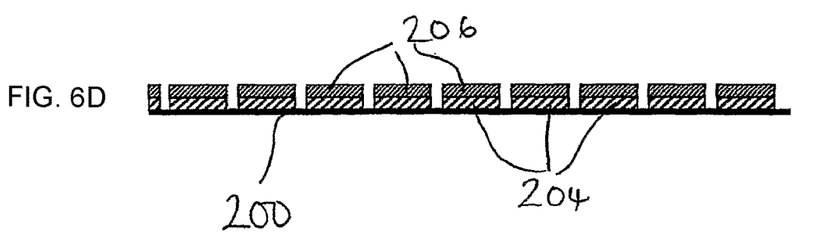
Figure 6E:
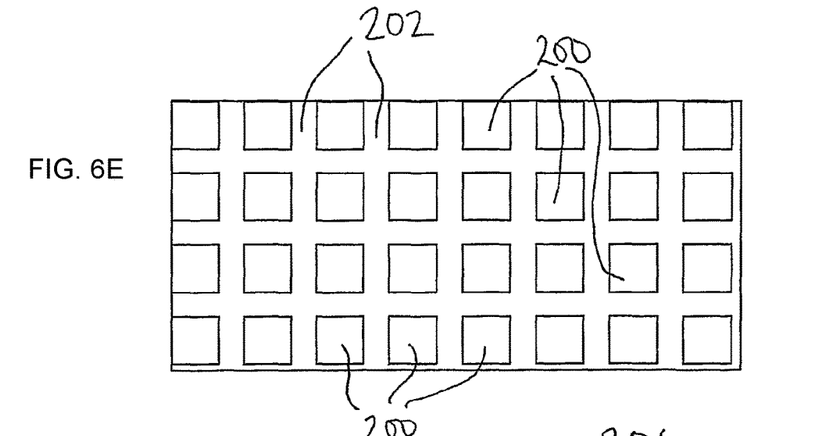

The substrate for this embodiment was a strip of aluminium foil 200 60 mm wide and 260 mm long, and with a thickness of 0.1 mm. The foil 200 was thoroughly cleaned with acetone before use. The coupon foil was then mounted onto a turntable in a plasma spray booth, containing a robot manipulation system. The spray system was set to work in nitrogen and with an aluminium-bronze feed. Nitrogen flow was preset to 50 liters/min, hydrogen to 3 liters/min and current to 400 A. The robot was programmed to operate a ladder type spray pattern, at a stand off distance of 120 mm from the foil, while the foil 200 was rotated. A 3 mm×3 mm mesh 202 was attached to the foil 200. The foil was thermally sprayed, through the mesh, with an Al-bronze bond coat 204

Figure 6F:
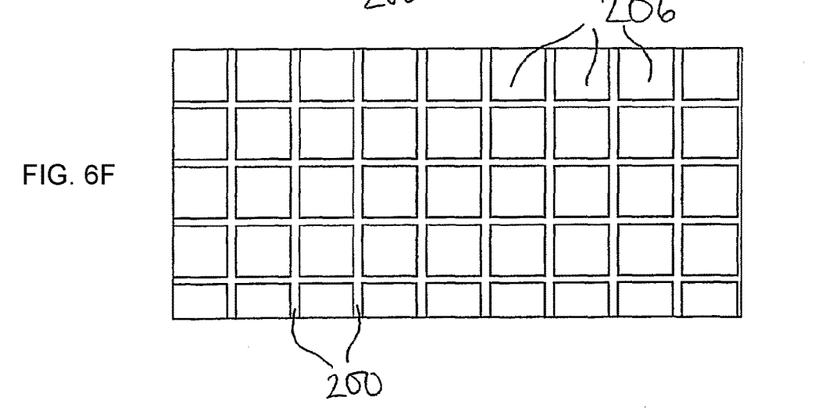

A magnesium zirconate layer 206 was then sprayed onto the bond coat 202, through the mesh 202, using the same spraying parameters as for the bond coat, at a stand off distance of 75 mm. The mesh 202 was then removed manually. The resulting coating on the foil 200 comprised an array of square elements with dimensions of about 2 mm×2 mm, each comprising an Al-bronze layer 204 and a magnesium zirconate layer 206

Thus the ceramic has very fine discontinuities in which convective movement of air is restricted, and in which heat transfer by conduction dominates. Thus by utilising the low thermal conductivity of air, this technique provides a ceramic layer with improved thermal barrier properties, and also a significant weight reduction. Further, the underlying foil can remain relatively flexible if the direction of bending is aligned with the air gaps in the ceramic layer. Therefore, the foil of this embodiment can be used to wrap around or be moulded onto components or surfaces which it is not possible or not practical to thermally spray with ceramic directly. Indeed, the article so produced can be rolled up, so that it can be conveniently transported or stored in roll form. This method can also be seen to be useful for other substrates which require flexibility, for example for tubes.

Figure 6G:
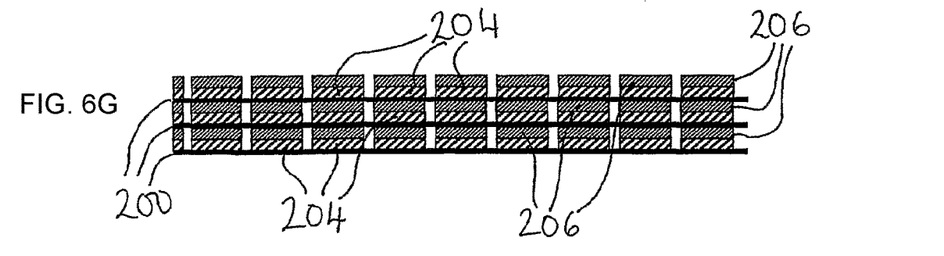

Multiple layers of foil may be stacked together to trap air in the overall structure.

Although in this embodiment gaps which are open to the air are created in the ceramic layer by spraying through a mesh, sacrificial inclusions, for example, tape or salt solution laid down using tape as in embodiment 4, could be used to create a mesh-like pattern to produce a similar effect in the final ceramic layer once the sacrificial inclusions are removed, for example by dissolving or burning out.

In addition, in the above embodiment, the air gaps are through the entire thickness of the bond coat and ceramic layers. However, it should be seen that it would also be possible to create an arrangement in which the air gaps do not extend the entire depth of the bond layer and ceramic layer for example by using a different mesh; by applying the bond coat to the whole of the foil surface, and then masking the bond coat in suitable way, and spraying only the ceramic layer through the mask: or by applying one coat of ceramic, masking the coat in a suitable way, and then applying another coat of ceramic.

Although, in the above embodiments, thermal spraying has been used to create the layers, it would be apparent to the skilled man that another suitable system, for example screen printing, could be used to create the layers.

The invention claimed is:

1. An article for insulation, the article comprising:
a flexible substrate and a working layer thereon;
the working layer comprising an array of insulating elements, the insulating elements being separated by gaps so that the article is flexible, wherein the insulating elements are made of at least one of metal or ceramic; and
wherein the substrate is a metal foil.

2. An article according to claim 1, wherein the article comprises at least one further flexible substrate over the working layer.

3. An article according to claim 2, wherein the article includes a further working layer on the further flexible substrate, the further working layer comprising an array of insulating elements, the insulating elements being separated by gaps.

4. An article according to claim 1, wherein the working layer is a thermally sprayed layer.

5. An article as claimed in claim 1, wherein a plurality or the gaps are aligned to form straight, open grooves.

6. An article according to claim 1, wherein the gaps are more than 0.5 mm in size.

7. An article according to claim 1, wherein the gaps are no more than 5 mm in size.

8. An article according to claim 1, wherein the percentage by volume of gaps in the layer is between 15% and 45%.

9. An article according to claim 1, wherein the article includes a bonding layer between the working layer and the substrate.

10. A method of making an insulating article, the method comprising the steps of:
applying a layer of insulating material to a flexible substrate, wherein the insulating material is made of at least one of metal or ceramic;
before, during or after the step of applying the layer, introducing pocket or gap creation means; and then
removing the pocket or gap creation means to achieve a layer with pockets or gaps
wherein the flexible substrate is a metal foil.

11. A method according to claim 10, wherein the step of applying the layer of material to the flexible substrate comprises thermally spraying the substrate with the layer of material.

12. A method according to claim 10, wherein the pocket or gap creation means is removed by dissolving.

13. A method according to claim 10, wherein the pocket or gap creation means is a liquid such as a paint or adhesive or other hardenable liquid material applied to part of a surface of the substrate.

14. A method according to claim 10, wherein the pocket or gap creation means is a mesh or other partial barrier, through which a coating is thermally sprayed.

15. A method according to claim 14, wherein the step of removing the pocket or gap creation means comprises mechanically removing the pocket or gap creation means.

16. A method according to claim 11, further comprising applying a bonding layer by thermal spraying before the step of applying the thermally sprayed layer of insulating material.

* * * * *